US012719391B2

(12) United States Patent
Sakuma et al.

(10) Patent No.: US 12,719,391 B2
(45) Date of Patent: Aug. 25, 2026

(54) MOTOR CONTROL DEVICE, MOTOR DRIVE CONTROL DEVICE, MOTOR DEVICE, AND MOTOR CONTROL PROGRAM

(71) Applicant: MINEBEA MITSUMI Inc., Kitasaku-gun (JP)

(72) Inventors: Tomotaka Sakuma, Kitasaku-gun (JP); Akihiro Nakamura, Kitasaku-gun (JP); Kazuki Akahori, Kitasaku-gun (JP)

(73) Assignee: MINEBEA MITSUMI INC., Nagano (JP)

( * ) Notice: Subject to any disclaimer, the term of this patent is extended or adjusted under 35 U.S.C. 154(b) by 150 days.

(21) Appl. No.: 18/354,127

(22) Filed: Jul. 18, 2023

(65) Prior Publication Data

US 2024/0030840 A1 Jan. 25, 2024

(30) Foreign Application Priority Data

Jul. 22, 2022 (JP) ................................. 2022-117393

(51) Int. Cl.
*H02P 3/20* (2006.01)
*H02K 11/33* (2016.01)
*H02P 6/17* (2016.01)
*H02P 27/06* (2006.01)

(52) U.S. Cl.
CPC ................ *H02P 3/20* (2013.01); *H02K 11/33* (2016.01); *H02P 6/17* (2016.02); *H02P 27/06* (2013.01)

(58) Field of Classification Search
CPC ... H02P 3/20; H02P 6/17; H02P 27/06; H02K 11/33
See application file for complete search history.

(56) References Cited

U.S. PATENT DOCUMENTS 8,674,641 B2 * 3/2014 Zhang ........................ H02P 6/16 318/473
2016/0018753 A1 * 1/2016 Sugimoto ............ G03G 15/043 347/118
2016/0089790 A1 * 3/2016 Wang ..................... B25J 9/1694 700/255

(Continued)

FOREIGN PATENT DOCUMENTS

JP 2017-184291 A 10/2017
WO 2018/142836 A1 8/2018

OTHER PUBLICATIONS

First Office Action dated Oct. 27, 2025 for corresponding Japanese Application No. 2022-117393 and English translation.

*Primary Examiner* — Zoheb S Imtiaz
(74) *Attorney, Agent, or Firm* — Chrisman Gallo Tochtrop LLC

(57) ABSTRACT

A drive control device includes a rotation speed calculation unit configured to calculate a rotation speed of a motor based on a rotation position detection signal of the motor, an energization stop time period calculation unit configured to calculate an energization stop time period for stopping energization to all phases of coils of the motor based on a target rotation speed and the rotation speed of the motor, and an energization signal generation unit configured to generate an energization signal for controlling energization to the coils of the motor to switch energization to the coils of the motor and to stop energization to all the coils of the motor in the energization stop time period.

13 Claims, 8 Drawing Sheets

(56) References Cited

U.S. PATENT DOCUMENTS

2017/0279387 A1 9/2017 Kaidu
2019/0068092 A1* 2/2019 Kaidu ..................... H02P 6/157
2020/0021212 A1 1/2020 Yamada et al.
2021/0046887 A1* 2/2021 Yamashita .......... B60R 16/0231
2022/0209698 A1* 6/2022 Kobayashi .............. H02P 23/14

* cited by examiner

MOTOR CONTROL DEVICE, MOTOR DRIVE CONTROL DEVICE, MOTOR DEVICE, AND MOTOR CONTROL PROGRAM

CROSS-REFERENCE TO RELATED APPLICATIONS

This application claims the benefit of priority to Japanese Patent Application Number 2022-117393 filed on Jul. 22, 2022. The entire contents of the above-identified application are hereby incorporated by reference.

TECHNICAL FIELD

The disclosure relates to a motor control device, a motor drive control device, a motor device, and a motor control program.

BACKGROUND

Generally, in a motor, vibration occurs due to switching of energization to coils during driving. In order to reduce such vibration generated when the energization to the coils is switched, a motor drive control device is known being configured to perform overlap energization in which before the end of energization to any of phases (coils) of the motor, energization to the other phases is continued for a predetermined time period (see JP 2017-184291).

SUMMARY

However, in conventional techniques, since the energization is switched at a constant interval when the overlap energization is switched, vibration occurs when the energization is switched. For this reason, further improvement is demanded to reduce the vibration caused by the switching of energization to coils in a motor.

The disclosure is for the problem described above, as one example, and has an object to provide a technique for reducing vibration caused by switching of energization to coils.

In order to achieve the object described above, a motor control device according to the disclosure includes a rotation speed calculation unit configured to calculate a rotation speed of a motor based on a rotation position detection signal of the motor, an energization stop time period calculation unit configured to calculate an energization stop time period for stopping energization to all coils included in the motor based on the rotation speed of the motor, and an energization signal generation unit configured to generate an energization signal for controlling energization to each of the coils of the motor to switch energization to each of the coils of the motor and to stop energization to all the coils of the motor in the energization stop time period.

According to the motor control device according to the disclosure, vibration caused by switching of energization to the coils can be reduced.

DESCRIPTION OF EMBODIMENTS

A motor control device, a motor drive control device, a motor device, and a motor control program according to an embodiment of the disclosure will be described below with reference to the drawings.

Figure 1:
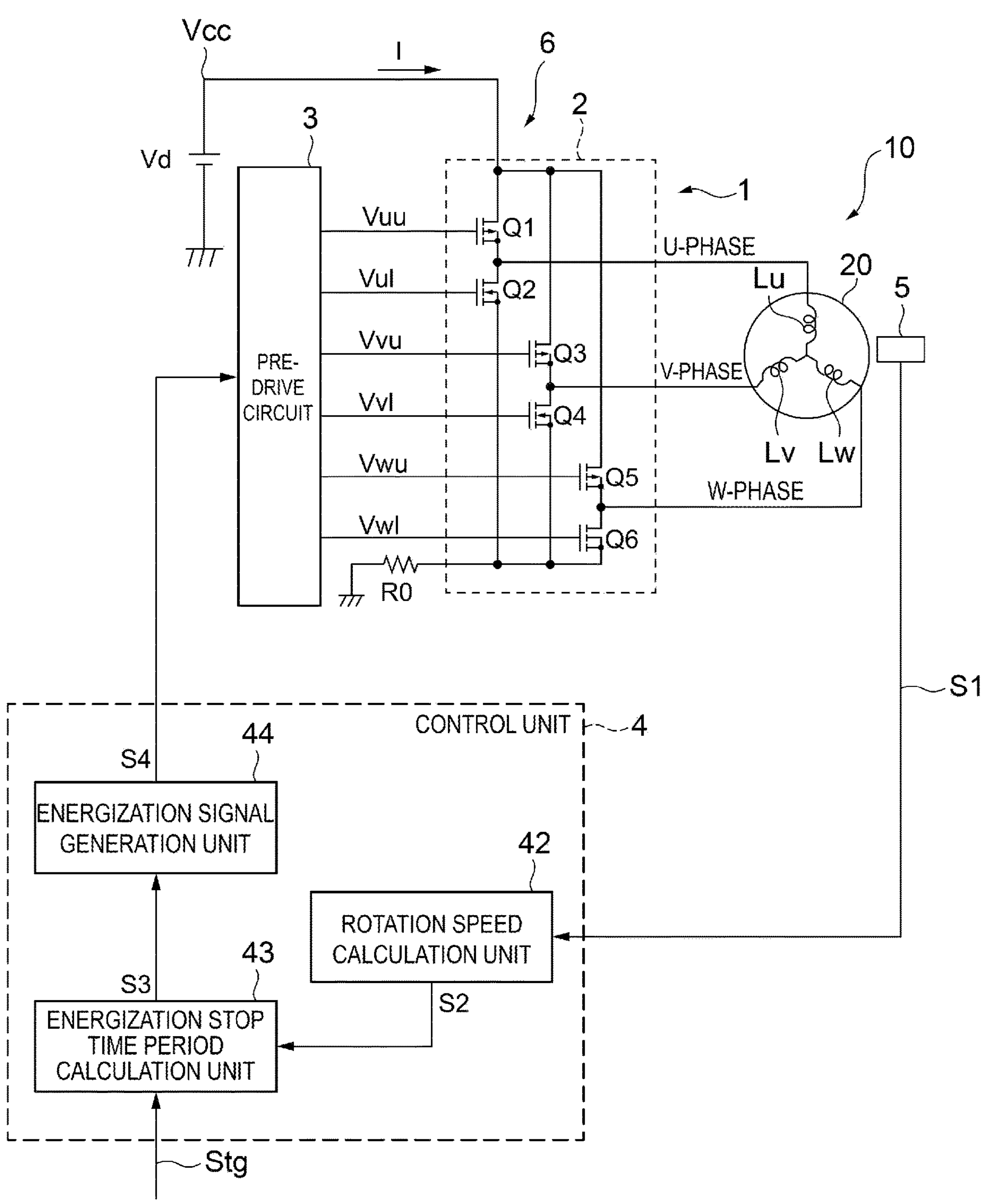
FIG. 1 is a block diagram schematically illustrating a configuration of a motor device provided with a drive control device according to an embodiment of the disclosure.

FIG. 1 is a block diagram schematically illustrating a configuration of a motor device 10 provided with a control unit 4 according to the embodiment of the disclosure. As illustrated in FIG. 1, the motor device 10 includes a motor 20 and a drive control device 1.

The motor 20 is a three-phase brushless DC motor and includes a plurality of coils, that is, coils Lu, Lv, and Lw of respective phases, and a rotor (not illustrated). The coils Lu, Lv, and Lw form a Y-shaped connection at each one end. The other ends of the coils Lu, Lv, and Lw are respectively connected to a U-phase output, a V-phase output, and a W-phase output of an inverter circuit 2 to be described later. The motor 20 is rotationally driven by a three-phase alternating current power supplied from the inverter circuit 2. Note that the motor 20 is not limited to the three-phase brushless DC motor, and may be, for example, a single-phase brushless DC motor.

The drive control device 1 is an example of the motor drive control device according to the disclosure. The drive control device 1 includes the control unit 4, a rotation position detection unit 5, and a drive circuit 6.

The rotation position detection unit 5 is, for example, a Hall element configured to output a signal according to a rotation position of the motor 20, specifically, positions of magnetic poles of the rotor. The rotation position detection unit 5 outputs a rotation position detection signal S1 corresponding to the detected positions of the magnetic poles of the rotor. The rotation position detection signal S1 is input to the control unit 4.

Note that the rotation position detection unit 5 is not limited to the Hall element. The rotation position detection unit 5 may be, for example, a detection circuit of a back electromotive voltage.

The drive circuit 6 includes the inverter circuit 2 configured to drive the motor 20 and a pre-drive circuit 3. Power is supplied to the drive circuit 6 by a power supply voltage Vcc applied from a direct current power supply Vd. A power supply current I flows from the direct current power supply Vd to the inverter circuit 2. The drive circuit 6 is supplied with electric power from the direct current power supply Vd and causes drive currents to flow through the U-phase, V-phase, and W-phase coils Lu, Lv, and Lw of the motor 20 based on an energization signal S4, which will be described later, output from the control unit 4 to rotate the rotor. The drive circuit 6 drives the motor 20 by, for example, 120° energization.

The inverter circuit 2 is connected to the pre-drive circuit 3 and the coils Lu, Lv, and Lw of the respective phases included in the motor 20. The inverter circuit 2 energizes the coils Lu, Lv, and Lw of the respective phases of the motor 20 based on drive signals Vuu to Vwl of the pre-drive circuit 3.

The inverter circuit 2 includes a U-phase switching leg connected with switching elements Q1 and Q2 in series, a V-phase switching leg connected with switching elements Q3 and Q4 in series, and a W-phase switching leg connected with switching elements Q5 and Q6 in series. The switching elements Q1 to Q6 are, for example, field effect transistors (FETs). Note that the switching elements Q1 to Q6 may be insulated gate bipolar transistors (IGBTs). The inverter circuit 2 is connected to the direct current power supply Vd, and is further connected to a resistor element R0.

The U-phase, V-phase, and W-phase switching legs include the switching elements Q1, Q3, and Q5 at an upper arm side and the switching elements Q2, Q4, and Q6 at a lower arm side, respectively. Each of drain terminals of the switching elements Q1, Q3, and Q5 is connected to a positive electrode of the direct current power supply Vd. Source terminals of the switching elements Q1, Q3, and Q5 are connected to drain terminals of the switching elements Q2, Q4, and Q6, respectively, and U-phase, V-phase, and W-phase alternating current signals are output from these connection points. Each of source terminals of the switching elements Q2, Q4, and Q6 is connected to a ground (a negative electrode of the direct current power supply Vd) through the resistor element R0. Each of gate terminals of the switching elements Q1 to Q6 is connected to the pre-drive circuit 3.

When the inverter circuit 2 is supplied with power from the direct current power supply Vd and input with the drive signals Vuu to Vwl from the pre-drive circuit 3, the inverter circuit 2 causes a three-phase alternating current to flow through a U-phase wiring line, a V-phase wiring line, and a W-phase wiring line of the motor 20.

The pre-drive circuit 3 constitutes a motor drive unit in combination with the connected inverter circuit 2, and is connected to the control unit 4. The pre-drive circuit 3 includes, for example, six gate drive circuits, and generates the drive signals Vuu to Vwl for driving the inverter circuit 2.

For example, the control unit 4 includes hardware elements including a processor such as a central processing unit (CPU), various types of memories such as a read only memory (ROM), a random access memory (RAM) and the like, and hardware elements such as a timer, a counter, an A/D conversion circuit, an input-output I/F circuit, a clock generation circuit and the like, and is a program processing unit (for example, a computer such as a micro control unit (MCU)). In this program processing unit, constituent elements are connected to each other through a bus, or a dedicated line. The control unit 4 includes, for example, a rewritable nonvolatile storage device such as a flash memory, an electrically erasable programmable read-only memory (EEPROM) or the like as a memory.

The control unit 4 is an example of a motor control device according to the disclosure, and outputs the energization signal S4 to the drive circuit 6. As illustrated in FIG. 1, the control unit 4 includes a rotation speed calculation unit 42, an energization stop time period calculation unit 43, and an energization signal generation unit 44.

The control unit 4 performs PWM control of the drive circuit 6 by using the above-described functional units. The above-described processor in the MCU executes various types of calculations in accordance with a motor control program stored in a memory, and controls a peripheral circuit such as a timer and a counter, an A/D conversion circuit and an input-output I/F circuit and the like, and thus, these functional blocks are achieved.

The rotation speed calculation unit 42 calculates a rotation speed of the motor 20 based on the rotation position detection signal S1 of the motor 20, and generates a rotation speed signal S2 corresponding to the rotation speed of the motor 20.

The energization stop time period calculation unit 43 acquires information about a target rotation speed Stg of the motor 20 from a drive command signal (for example, a pulse width modulation (PWM) signal) input from an external device, a memory, or the like. Based on the target rotation speed Stg of the motor 20 and the rotation speed signal S2, the energization stop time period calculation unit 43 calculates a time period for energizing each of the coils Lu, Lv, and Lw of the motor 20, and thus, the motor 20 rotates at a desired rotation speed (at the number of rotations).

Additionally, the energization stop time period calculation unit 43 calculates an energization stop time period when energization to the coils Lu, Lv, and Lw of all phases of the motor 20 is stopped based on the rotation speed signal S2 of the motor 20. The energization stop time period calculation unit 43 calculates the energization stop time period according to the rotation speed signal S2, for example, so as to shorten the energization stop time period when the rotation speed increases. The energization stop time period calculation unit 43 calculates the energization stop time period according to the rotation speed signal S2, thereby adjusting the energization stop time period so that a ratio of the energization stop time period with respect to one energization time period does not change according to the rotation speed. The energization stop time period calculation unit 43 generates an energization command signal S3 for commanding stop of energization to the coils Lu, Lv, and Lw of all phases of the motor 20 according to the calculated energization stop time period. The energization command signal S3 includes a signal for commanding energization to the coils Lu, Lv, and Lw of the respective phases of the motor 20.

The energization signal generation unit 44 generates the energization signal S4 for controlling energization to the respective phases of the coils Lu, Lv, and Lw of the motor 20 in accordance with the energization command signal S3 in order to switch energization to the coils Lu, Lv, and Lw of the respective phases of the motor 20 and to stop energization to the coils Lu, Lv, and Lw of all phases of the motor 20 in the energization stop time period. The generated energization signal S4 is output from the energization signal generation unit 44 to the pre-drive circuit 3.

To be specific, the energization signal generation unit 44 sets the energization signal S4 so as to perform switching of energization as follows. The energization signal generation unit 44 outputs, to the pre-drive circuit 3 (a part of the motor drive unit), the energization signal S4 for performing control such that execution and stop of energization to any of the coils Lu, Lv, and Lw of the motor 20 are alternately repeated. In the present embodiment, a phenomenon occurring once with one rotation of the rotor of the motor 20 defined as one cycle is regarded as a first order component, and a cycle corresponding to the number of energization switching times n per one rotation of the rotor is defined as an n-th order component. Note that, before the end of energization to any of the coils Lu, Lv, and Lw of the motor 20, that is, during energization to any of the coils Lu, Lv, and Lw, the energization signal generation unit 44 may perform overlap energization in which energization to the coils Lu, Lv, and Lw being energized other than the any of the coils Lu, Lv, and Lw described above in the motor 20 is continued over a predetermined time period.

After the end of energization to any of the coils Lu, Lv, and Lw of the motor 20, the energization signal generation unit 44 stops energization to the coils Lu, Lv, and Lw being energized other than the any of the coils Lu, Lv, and Lw described above over the energization stop time period in the motor 20. The energization signal generation unit 44 stops energization to all the coils Lu, Lv, and Lw including the coils Lu, Lv, and Lw where energization has been stopped by stopping energization to the coils Lu, Lv, and Lw other than the any of the coils Lu, Lv, and Lw described above over the energization stop time period in this manner. Specifically, the energization stop time period may be started at (simultaneously with) the end of energization to any of the coils Lu, Lv, and Lw of the motor 20, or may be started after the elapse of a predetermined time period after the end of the energization.

For example, in a case of a brushless motor having four poles and six slots, switching of energization occurs 12 times per one rotation. In the motor 20, the switching of the energization resonates with an eigenvalue (natural frequency) of the motor, thereby making an electromagnetic vibration component large. Here, the number of energization switching times per one rotation is obtained by multiplying one half of the number of poles by the number of energization switching times per one pole (for example, six times in a case of three phases).

The energization signal generation unit 44 outputs, to the pre-drive circuit 3, the energization signal S4 including control for stopping energization to the coils Lu, Lv, and Lw being energized other than any of the coils Lu, Lv, and Lw over the energization stop time period in the motor 20 after the end of energization to the any of the coils Lu, Lv, and Lw described above in addition to normal switching energization to the coils Lu, Lv, and Lw of the motor 20. Thus, the motor device 10 can suppress the electromagnetic vibration component by dispersing the n-th order component corresponding to the number of energization switching times n per one rotation of the rotor, which causes the occurrence of the electromagnetic vibration component, into the other order components.

Next, an example of waveforms of PWM signals in the drive control device 1 will be described with reference to timing charts. Each of the timing charts to be described below indicates an example of waveforms of PWM signals output from the drive control device 1 to the motor 20 when the rotation speed of the motor 20 included in the motor device 10 is constant.

Figure 2:
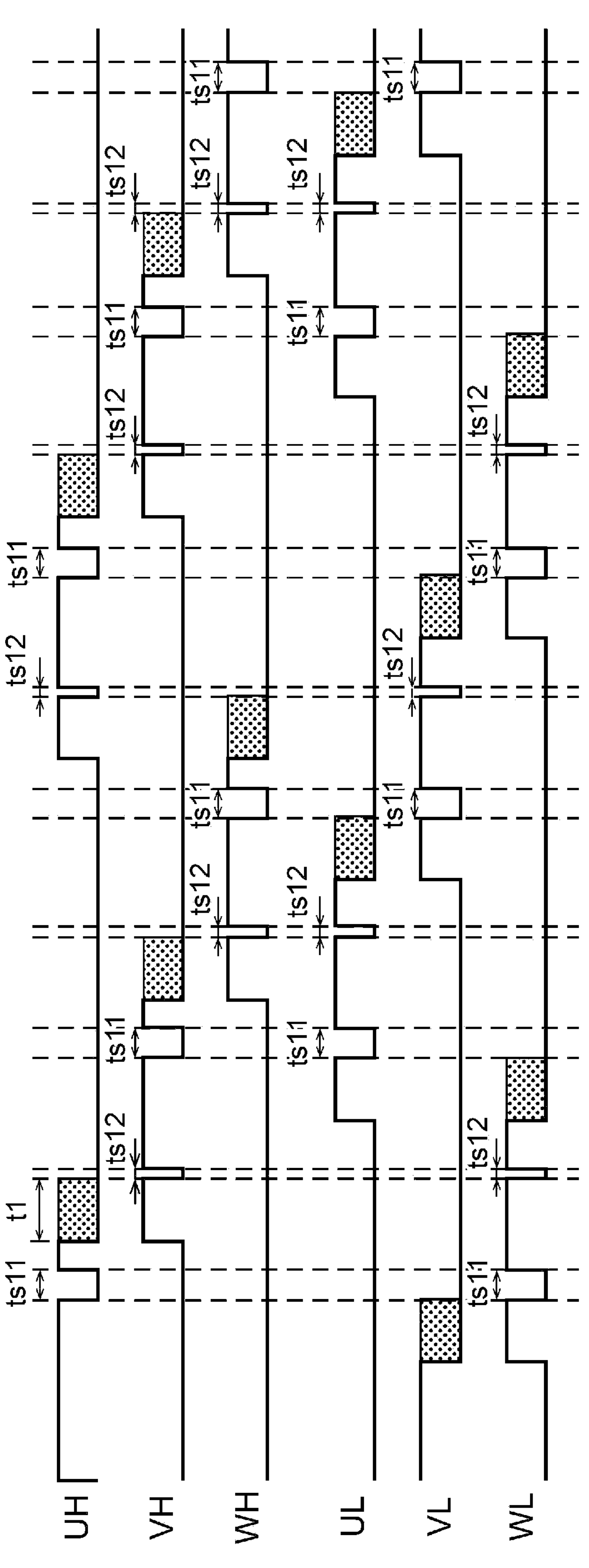
FIG. 2 is a timing chart illustrating Example 1 of waveforms of PWM signals in the drive control device according to the present embodiment.

FIG. 2 is a timing chart illustrating Example 1 of waveforms of PWM signals in the drive control device 1. FIG. 2 illustrates drive waveforms of an overlap energization system. In FIG. 2, a waveform UH indicates a drive signal Vuu, a waveform VH indicates a drive signal Vvu, and a waveform WH indicates a drive signal Vwu. The waveforms UH, VH, and WH of these three drive signals sequentially repeat an H level. Further, a waveform UL indicates a drive signal Vul, a waveform VL indicates a drive signal Vvl, and a waveform WL indicates a drive signal Vwl. The waveforms UL, VL, and WL of these three drive signals sequentially repeat the H level.

Initially, the waveforms UH and VL become the H level, and a power supply current I flows from the direct current power supply Vd to the ground through the switching element Q1, the coils Lu and Lv, and the switching element Q4.

Next, the waveform WL becomes the H level, and the power supply current I newly flows from the direct current power supply Vd to the ground through the switching element Q1, the coils Lu and Lw, and the switching element Q6. Since the power supply current I flows through two systems being the coils Lu and Lv and the coils Lu and Lw in an overlapping manner as described above, the system is called an overlap energization system. Then, when a time period t1 elapses, the waveform VL becomes an L level, and the switching element Q4 is turned off. As a result, the power supply current I flows from the direct current power supply Vd to the ground only through the switching element Q1, the coils Lu and Lw, and the switching element Q6.

Next, the waveform VH becomes the H level, and the power supply current I newly flows from the direct current power supply Vd to the ground through the switching element Q3, the coils Lv and Lw, and the switching element Q6. That is, the power supply current I flows so as to overlap the two systems being the coils Lu and Lw and the coils Lv and Lw. Then, when the time period t1 elapses, the waveform UH becomes the L level, and the switching element Q1 is turned off. As a result, the power supply current I flows from the direct current power supply Vd to the ground only through the switching element Q3, the coils Lv and Lw, and the switching element Q6.

Next, the waveform UL becomes the H level, and the power supply current I newly flows from the direct current power supply Vd to the ground through the switching element Q3, the coils Lv and Lu, and the switching element Q2. That is, the power supply current I flows through the two systems being the coils Lv and Lw and the coils Lv and Lu in an overlapping manner. Then, when the time period t1 elapses, the waveform WL becomes the L level, and the switching element Q6 is turned off. As a result, the power supply current I flows from the direct current power supply Vd to the ground only through the switching element Q3, the coils Lv and Lu, and the switching element Q2.

Next, the waveform WH becomes the H level, and the power supply current I newly flows from the direct current power supply Vd to the ground through the switching element Q5, the coils Lw and Lu, and the switching element Q2. That is, the power supply current I flows through the two systems being the coils Lv and Lu and the coils Lw and Lu in an overlapping manner. Then, when the time period t1 elapses, the waveform VH becomes the L level, and the switching element Q3 is turned off. As a result, the power supply current I flows from the direct current power supply Vd to the ground only through the switching element Q5, the coils Lw and Lu, and the switching element Q2.

Next, the waveform VL becomes the H level, and the power supply current I newly flows from the direct current power supply Vd to the ground through the switching element Q5, the coils Lw and Lv, and the switching element Q4. That is, the power supply current I flows through the two systems being the coils Lw and Lu and the coils Lw and Lv in an overlapping manner. Then, when the time period t1 elapses, the waveform UL becomes the L level, and the switching element Q2 is turned off. As a result, the power supply current I flows from the direct current power supply Vd to the ground only through the switching element Q5, the coils Lw and Lv, and the switching element Q4. Similarly, the switching elements Q1 to Q6 are repeatedly turned on and off, so that the motor 20 rotates.

In Example 1 of the waveforms of the PWM signals in the drive control device 1 illustrated in FIG. 2, the energization signal generation unit 44 stops energization to all the coils Lu, Lv, and Lw being energized other than any of the coils Lu, Lv, and Lw in the motor 20, that is, energization for each of electrical angles, over predetermined energization stop time periods ts11 and ts12 after the end of energization to the any of the coils Lu, Lv, and Lw described above of the motor 20, specifically, simultaneously with the end of energization.

In Example 1 of the waveforms of the PWM signals illustrated in FIG. 2, after the end of the waveform VL indicating energization to the coil Lv, the waveform UH and the waveform WL indicating energization to the other coils Lu and Lw being energized other than the coil Lv in the motor 20 are stopped over the energization stop time period ts11. Similarly, after the end of the waveform VH indicating energization to the coil Lv, the waveform UL and the waveform WH indicating energization to the other coils Lu and Lw being energized other than the coil Lv in the motor 20 are stopped over the energization stop time period ts12.

In Example 1 of the waveforms of the PWM signals illustrated in FIG. 2, after the end of the waveform UH indicating energization to the coil Lu, the waveform VH and the waveform WL indicating energization to the other coils Lv and Lw being energized other than the coil Lu in the motor 20 are stopped over the energization stop time period ts12. Similarly, after the end of the waveform UL indicating energization to the coil Lu, the waveform VL and the waveform WH indicating energization to the other coils Lv and Lw being energized other than the coil Lu in the motor 20 are stopped over the energization stop time period ts11.

In Example 1 of the waveforms of the PWM signals illustrated in FIG. 2, the energization stop time periods ts11 and ts12 both start at the same time as the end of energization to any of the coils Lu, Lv, and Lw of the motor 20 as described above, but have different lengths of time periods. In Example 1 of the waveforms of the PWM signals, the energization stop time period ts11 is longer than the energization stop time period ts12. The lengths of the energization stop time periods ts11 and ts12 are merely examples, and the energization stop time periods ts11 and ts12 may have the same length or may have three or more types of lengths. In addition, the length of the energization stop time period may be changed according to the rotation speed or the like. When the length of the energization stop time period is changed according to the rotation speed, a ratio of the energization stop time period with respect to one energization time period can be maintained by, for example, shortening the length of the energization stop time period as the rotation speed increases.

Figure 3:
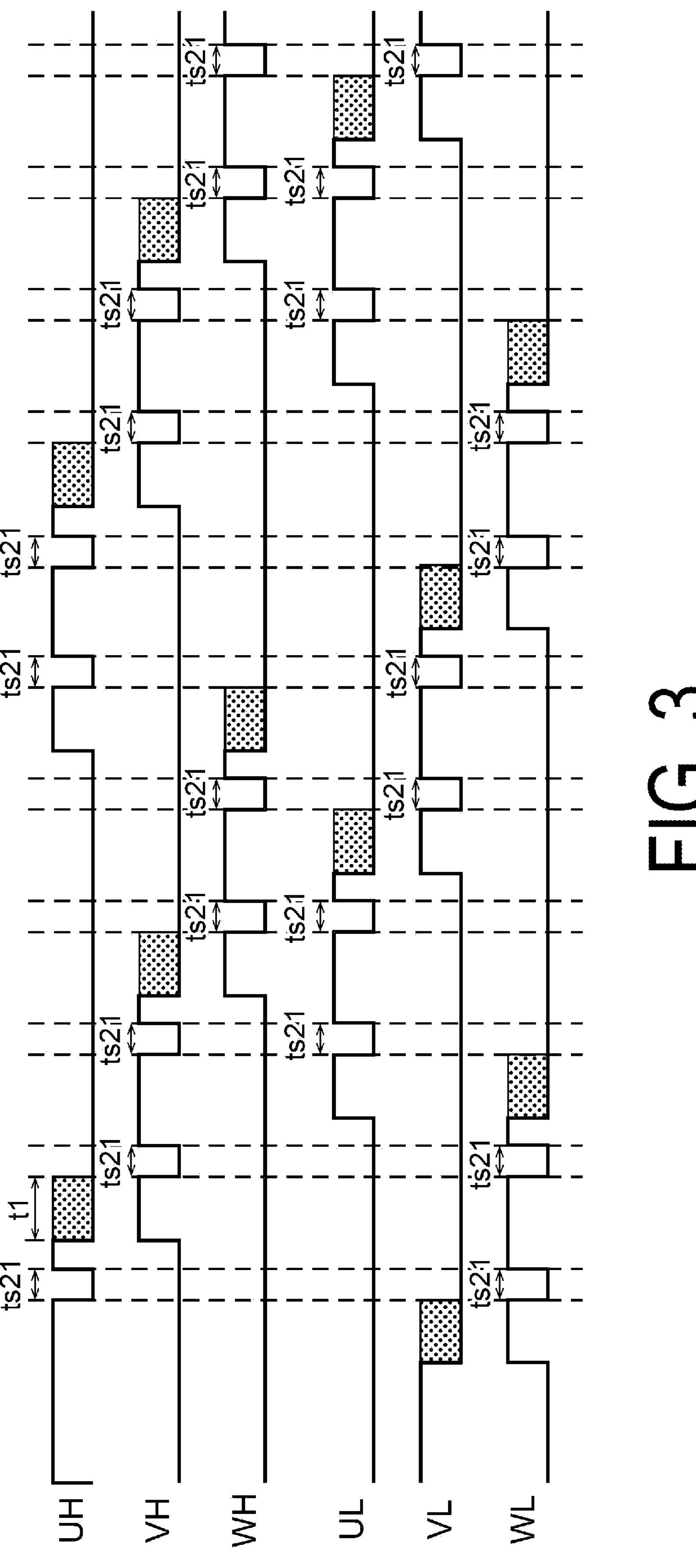
FIG. 3 is a timing chart illustrating Example 2 of waveforms of PWM signals in the drive control device according to the present embodiment.

FIG. 3 is a timing chart illustrating Example 2 of the waveforms of the PWM signals in the drive control device 1. FIG. 3 illustrates drive waveforms of the overlap energization system as in FIG. 2. Similar to FIG. 2, the waveforms UH, VH, and WH in FIG. 3 indicate the drive signals Vuu, Vvu, and Vwu, respectively, and repeat the H level in order. In addition, similar to FIG. 2, the waveforms UL, VL, and WL also indicate the drive signals Vul, Vvl, and Vwl, and repeat the H level in order.

In Example 2 of the waveforms of the PWM signals in the drive control device 1 illustrated in FIG. 3, similar to Example 1 of the waveforms of the PWM signals described above, the energization signal generation unit 44 stops energization to all the coils Lu, Lv, and Lw being energized other than any of the coils Lu, Lv, and Lw in the motor 20, that is, energization for each of electrical angles, over an energization stop time period ts21 after the end of energization to the any of the coils Lu, Lv, and Lw described above of the motor 20, specifically, simultaneously with the end of energization. The energization stop time period ts21 of Example 2 of the waveforms of the PWM signals is different from the energization stop time periods ts12 and ts11 of Example 1 described above in that the energization stop time period ts21 has the same length in every waveform.

Figure 4:
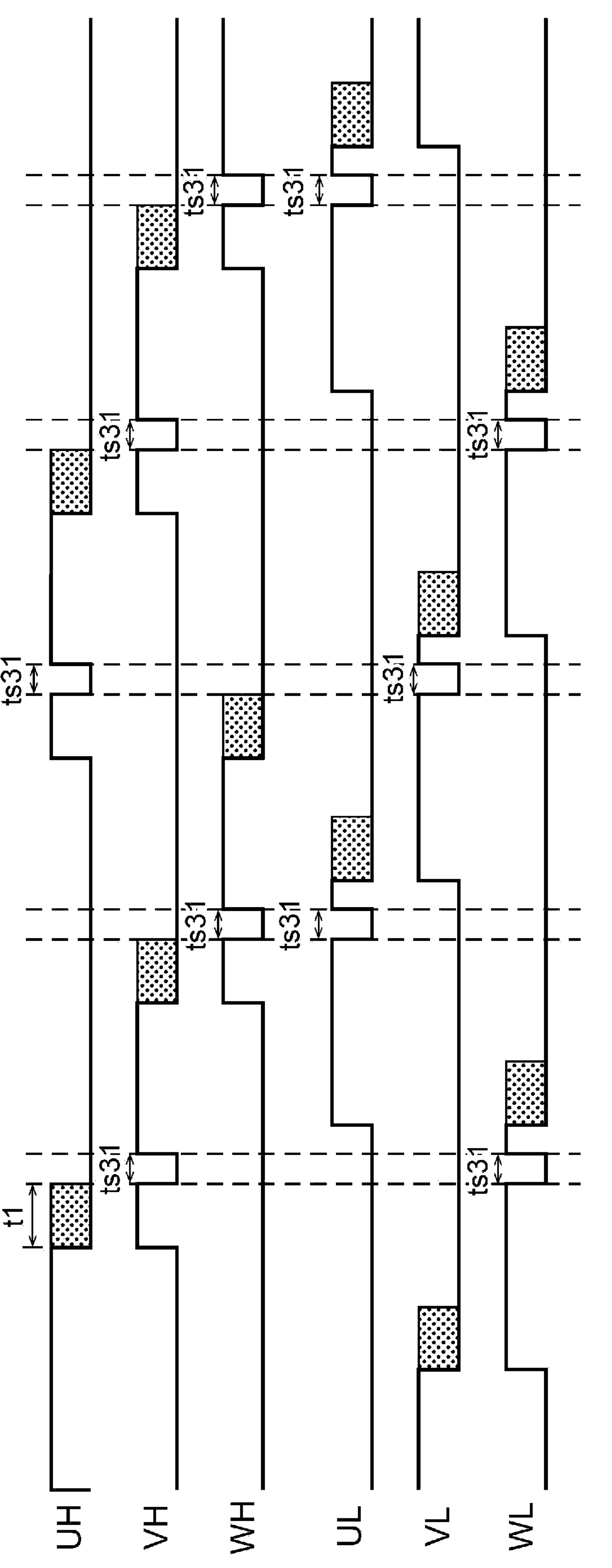
FIG. 4 is a timing chart illustrating Example 3 of waveforms of PWM signals in the drive control device according to the present embodiment.

FIG. 4 is a timing chart illustrating Example 3 of the waveforms of the PWM signals in the drive control device 1. FIG. 4 illustrates drive waveforms of the overlap energization system, similar to FIGS. 2 and 3. Similar to FIGS. 2 and 3, the waveforms UH, VH, and WH in FIG. 4 indicate the drive signals Vuu, Vvu, and Vwu, respectively, and repeat the H level in order. In addition, similar to FIGS. 2 and 3, the waveforms UL, VL, and WL also indicate the drive signals Vul, Vvl, and Vwl, and repeat the H level in order.

In Example 3 of the waveforms of the PWM signals in the drive control device 1 illustrated in FIG. 4, the energization signal generation unit 44 stops the energization to the coils Lu, Lv, and Lw being energized other than the any of the coils Lu, Lv, and Lw described above in the motor 20 over a predetermined energization stop time period ts31 at the same time as the end of energization of the PWM signal at a high side to each phase of the coils Lu, Lv, and Lw of the motor 20. In the drive control device 1, energization serving as a trigger for setting the energization stop time period is not limited to the example in which energization is performed for all of the coils Lu, Lv, and Lw of the motor 20 as illustrated in FIGS. 2 and 3, and may be performed for energization to some of the phases of the coils Lu, Lv, and Lw of the motor 20, for example, energization of the PWM signal at the high side, as illustrated in Example 3 of the waveforms of the PWM signals.

To be more specific, in Example 3 of the waveforms of the PWM signals illustrated in FIG. 4, after the end of the waveform UH indicating the energization of the PWM signal at the high side of the coil Lu, the waveform VH and the waveform WL indicating the energization to the other coils Lv and Lw being energized other than the coil Lu in the motor 20 are stopped over the energization stop time period ts31. Similarly, after the end of the waveform VH indicating the energization at the high side of the coil Lv, the waveform UL and the waveform WH indicating the energization to the other coils Lu and Lw being energized other than the coil Lv in the motor 20 are stopped over the energization stop time period ts31. Similarly, after the end of the waveform WH indicating the energization at the high side of the coil Lw, the waveform VL and the waveform UH indicating the energization to the other coils Lu and Lv being energized other than the coil Lw in the motor 20 are stopped over the energization stop time period ts31.

The length of the energization stop time period ts31 is an example, and two or more types of lengths may be set. In addition, the length of the energization stop time period may be changed according to the rotation speed or the like. Additionally, the energization serving as a trigger for setting the energization stop time period may be performed in accordance with the end of the energization of the PWM signal at a low side to each phase of the coils Lu, Lv, and Lw of the motor 20.

Figure 5:
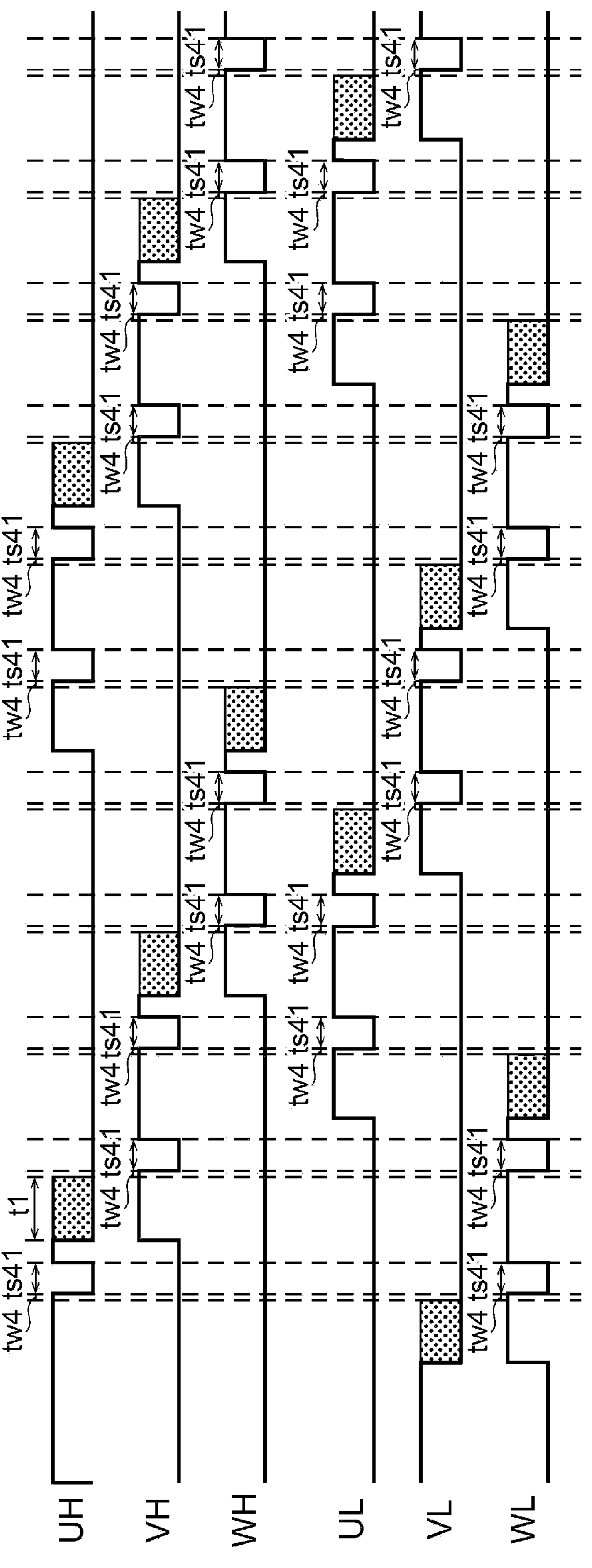
FIG. 5 is a timing chart illustrating Example 4 of waveforms of PWM signals in the drive control device according to the present embodiment.

FIG. 5 is a timing chart illustrating Example 4 of the waveforms of the PWM signals in the drive control device 1. FIG. 5 illustrates drive waveforms of the overlap energization system similar to FIGS. 2 to 4. Similar to FIGS. 2 to 4, the waveforms UH, VH, and WH in FIG. 5 indicate the drive signals Vuu, Vvu, and Vwu, respectively, and repeat the H level in order. In addition, similar to FIGS. 2 to 4, the waveforms UL, VL, and WL also indicate the drive signals Vul, Vvl, and Vwl and repeat the H level in order.

In Example 4 of the waveforms of the PWM signals in the drive control device 1 illustrated in FIG. 5, similar to Example 2 of the waveforms of the PWM signals described above, after the end of energization to any of the coils Lu, Lv, and Lw of the motor 20, the energization signal generation unit 44 stops energization to all the coils Lu, Lv, and Lw being energized other than the any of the coils Lu, Lv, and Lw described above in the motor 20, that is, stops energization for each of electrical angles. A start timing of an energization stop time period ts41 in Example 4 of the waveforms of the PWM signals is different from a start timing (at the same time as the end of energization) of the energization stop time period ts21 in Example 2 described above in that the start timing of the energization stop time period ts41 is after a predetermined interval tw4 elapses after the end of energization to any of the coils Lu, Lv, and Lw of the motor 20 in every waveform.

In the drive control device 1, the start timing of the energization stop time period generated by the energization signal generation unit 44 may be the same as the end of energization to any of the coils Lu, Lv, and Lw of the motor 20 as in Examples 1 to 3, or may be started after the elapse of the predetermined interval tw4 as in Example 4. In addition, in the drive control device 1, the length of the interval tw4 from the end of energization to the coils Lu, Lv, and Lw to the start of the energization stop time period is not particularly limited.

Figure 6:
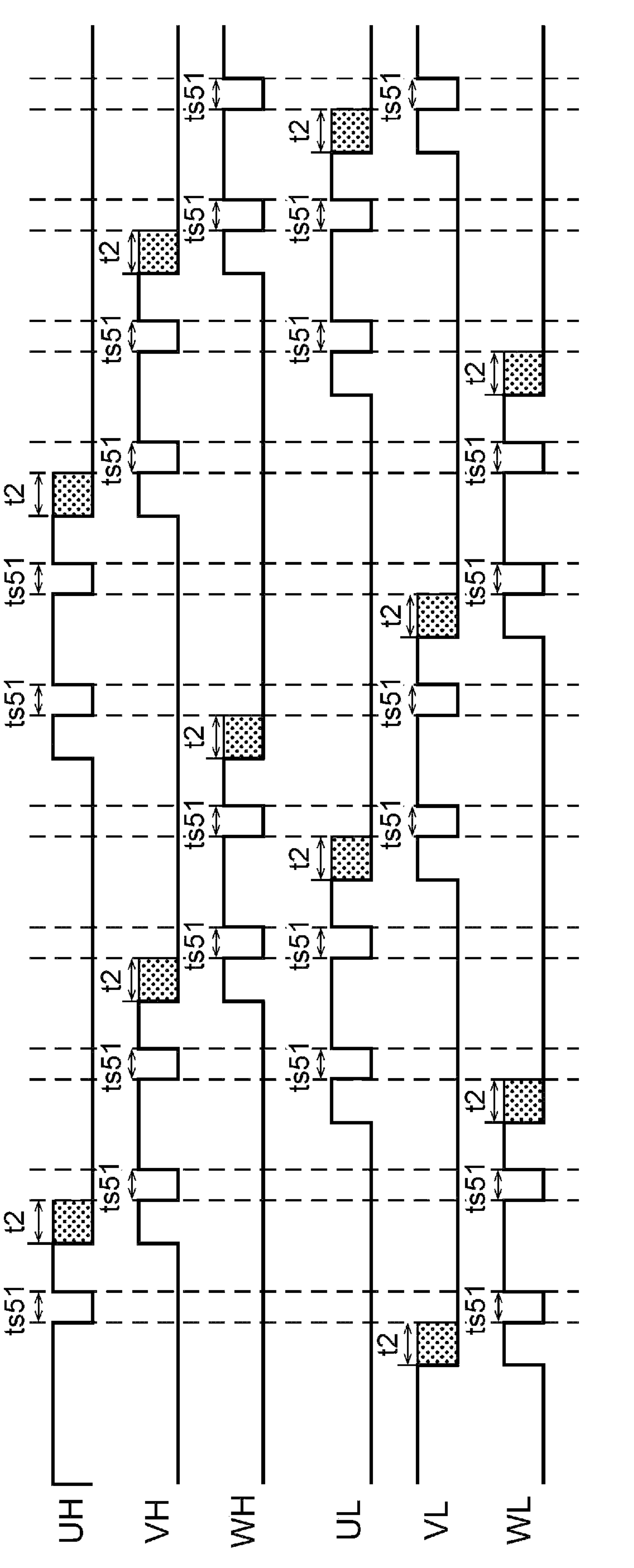
FIG. 6 is a timing chart illustrating Example 5 of waveforms of PWM signals in the drive control device according to the present embodiment.

FIG. 6 is a timing chart illustrating Example 5 of the waveforms of the PWM signals in the drive control device 1. FIG. 6 illustrates drive waveforms of the overlap energization system similar to FIGS. 2 to 5. Similar to FIGS. 2 to 5, the waveforms UH, VH, and WH in FIG. 6 indicate the drive signals Vuu, Vvu, and Vwu, respectively, and repeat the H level in order. In addition, similar to FIGS. 2 to 5, the waveforms UL, VL, and WL also indicate the drive signals Vul, Vvl, and Vwl, and repeat the H level in order.

In Example 5 of the waveforms of the PWM signals in the drive control device 1 illustrated in FIG. 6, similar to Example 2 of the waveforms of the PWM signals described above, after the end of energization to any of the coils Lu, Lv, and Lw of the motor 20, the energization signal generation unit 44 stops energization to all the coils Lu, Lv, and Lw being energized other than the any of the coils Lu, Lv, and Lw described above in the motor 20, that is, stops energization for each of electrical angles. Example 5 of the waveforms of the PWM signals is different from Example 2 described above in that a time period of energization to any of the coils Lu, Lv, and Lw of the motor 20, to be specific, a time period t2 of the overlap energization is shortened and an energization stop time period ts51 is started, in every waveform. In Example 5 of the waveforms of the PWM signals, the time period t2 of the overlap energization is shorter than the time period t1 of the overlap energization in Example 2 of the waveforms of the PWM signals described above or the like.

Figure 7:
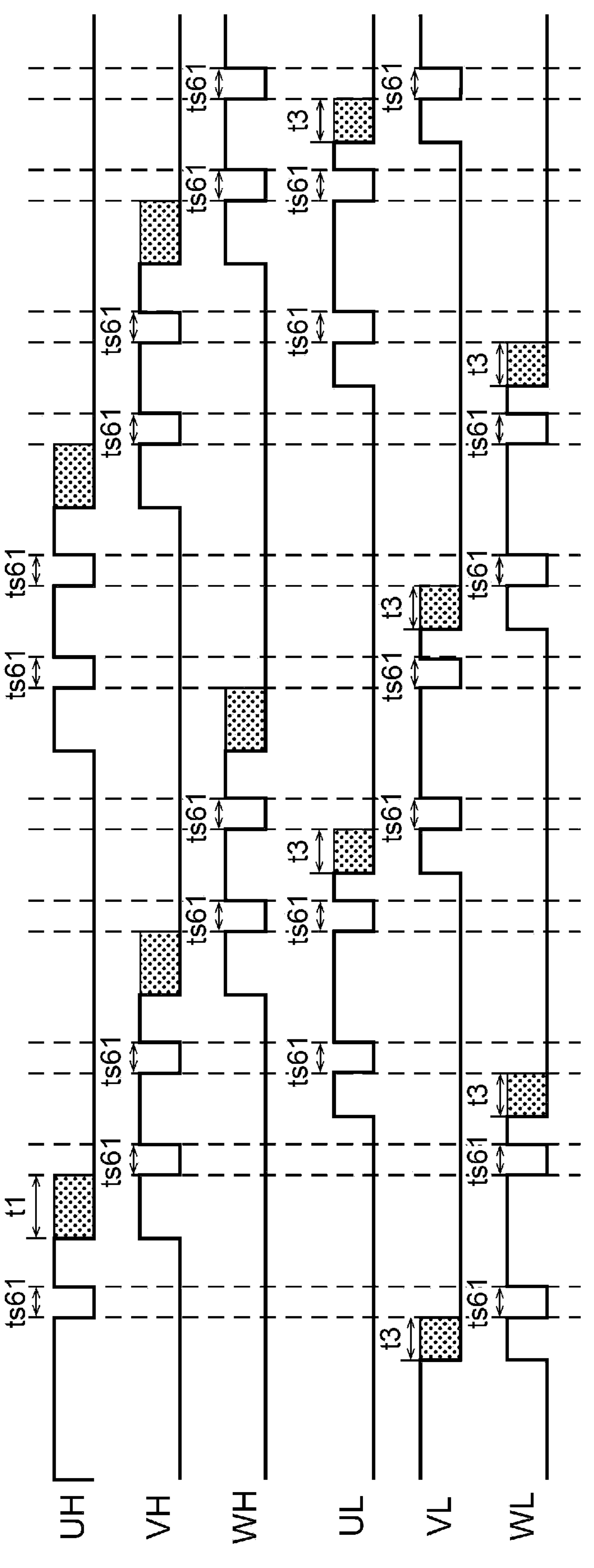
FIG. 7 is a timing chart illustrating Example 6 of waveforms of PWM signals in the drive control device according to the present embodiment.

FIG. 7 is a timing chart illustrating Example 6 of the waveforms of the PWM signals in the drive control device 1. FIG. 7 illustrates drive waveforms of the overlap energization system similar to FIGS. 2 to 6. Similar to FIGS. 2 to 6, the waveforms UH, VH, and WH in FIG. 7 indicate the drive signals Vuu, Vvu, and Vwu, respectively, and repeat the H level in order. In addition, similar to FIGS. 2 to 6, the waveforms UL, VL, and WL also indicate the drive signals Vul, Vvl, and Vwl, and repeat the H level in order.

In Example 6 of the waveforms of the PWM signals in the drive control device 1 illustrated in FIG. 7, similar to Example 5 of the waveforms of the PWM signals described above, after the end of energization to any of the coils Lu, Lv, and Lw of the motor 20, the energization signal generation unit 44 stops energization to all the coils Lu, Lv, and Lw being energized other than any of the coils Lu, Lv, and Lw described above in the motor 20, that is, stops energization for each of electrical angles. Example 6 of the waveforms of the PWM signals is different from Example 5 described above in that an energization time period is shortened only for the waveforms UL, VL, and WL indicating energization at the low side of energization to any of the coils Lu, Lv, and Lw of the motor 20, and an energization stop time period ts61 is started. In Example 6 of the waveforms of the PWM signals, a time period t3 of overlap energization for the waveforms UL, VL, and WL indicating energization at the low side is shorter than the time period t1 of overlap energization for the waveforms UH, VH, and WH indicating energization at the high side.

Figure 8:
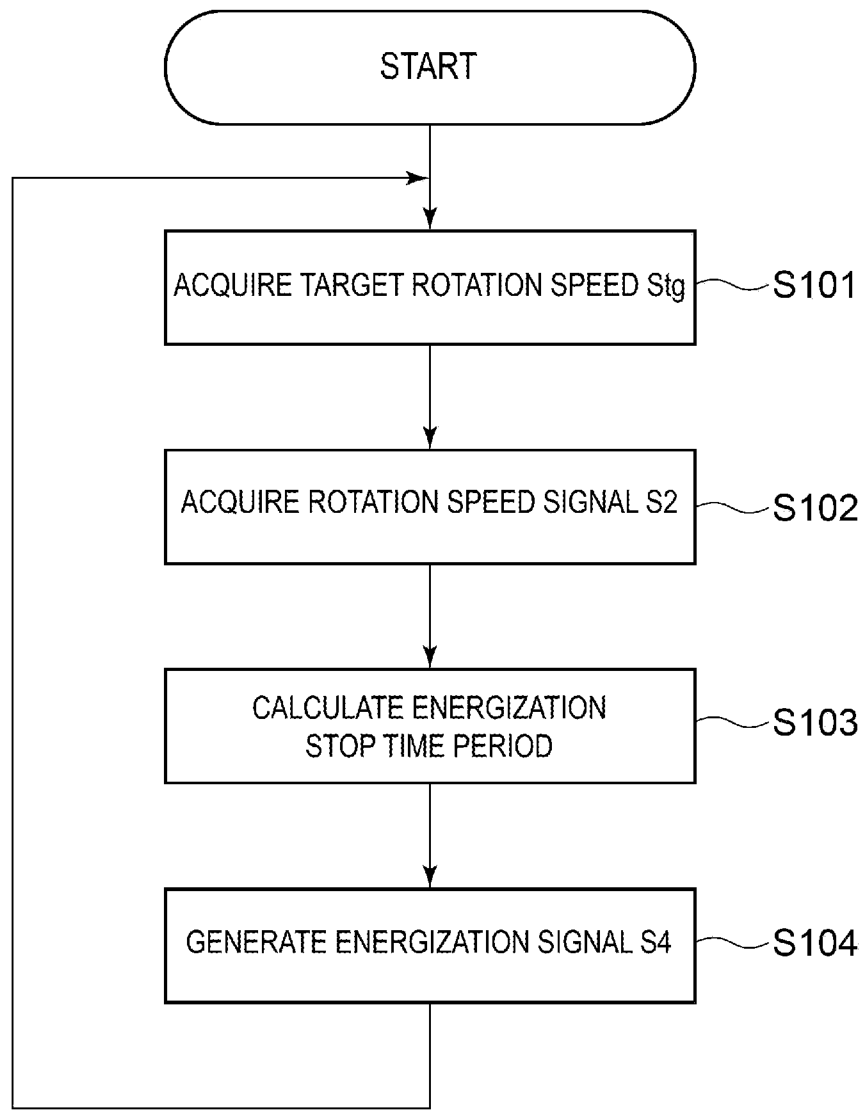
FIG. 8 is a flowchart for explaining a process of generating an energization signal in the drive control device according to the present embodiment.

FIG. 8 is a flowchart for explaining a process of generating an energization signal in the drive control device 1.

In the control unit 4, the energization stop time period calculation unit 43 acquires information about the target rotation speed Stg of the motor 20 from a drive command signal (for example, a pulse width modulation (PWM) signal) input from an external device, a memory, or the like (Step S101).

The energization stop time period calculation unit 43 acquires the rotation speed signal S2 corresponding to the rotation speed of the motor 20 generated by the rotation speed calculation unit 42 (Step S102).

The energization stop time period calculation unit 43 calculates an energization stop time period for stopping energization to the coils Lu, Lv, and Lw of all phases of the motor 20 based on the rotation speed signal S2 of the motor 20 (Step S103). The energization stop time period calculation unit 43 generates the energization command signal S3 for commanding stop of energization to the coils Lu, Lv, and Lw of all phases of the motor 20 according to the calculated energization stop time period.

The energization signal generation unit 44 generates the energization signal S4 for controlling energization to each phase of the motor 20 in accordance with the energization command signal S3 in order to switch energization to the coils Lu, Lv, and Lw of the respective phases of the motor 20 and to stop energization to the coils Lu, Lv, and Lw of all phases of the motor 20 in the energization stop time period (Step S104). The generated energization signal S4 is output from the energization signal generation unit 44 to the pre-drive circuit 3.

Operations and Effects of Embodiment

As described above, in the motor device 10, the control unit 4 of the drive control device 1 includes the rotation speed calculation unit 42 configured to calculate a rotation speed of the motor 20 based on a rotation position detection signal of the motor 20, the energization stop time period calculation unit 43 configured to calculate an energization stop time period for stopping energization to all phases of the coils Lu, Lv, and Lw of the motor 20 based on the target rotation speed Stg and the rotation speed of the motor 20, and the energization signal generation unit 44 configured to generate an energization signal for controlling energization to the coils Lu, Lv, and Lw of the motor 20 to switch energization to the coils Lu, Lv, and Lw of the motor 20 and to stop energization to all the coils Lu, Lv, and Lw of the motor 20 in the energization stop time period.

Specifically, as illustrated in FIG. 2 to FIG. 7, after the end of energization to any of the phases of the motor 20, the energization signal generation unit 44 stops energization to all the phases of the motor 20 by stopping energization to the other coils Lu, Lv, and Lw of the motor 20 being energized over the energization stop time period.

The drive control device 1 provided with the control unit 4 including the energization stop time period calculation unit 43 and the energization signal generation unit 44 sets the energization stop time period for the other coils Lu, Lv, and Lw being energized after the end of energization to any of the coils Lu, Lv, and Lw of the motor 20 as illustrated in FIG. 2 to FIG. 8. In this way, according to the drive control device 1, when the energization to the coils Lu, Lv, and Lw of the motor 20 is switched in the motor device 10, timings of energization stop states of the coils Lu, Lv, and Lw can be dispersed by setting the energization stop time period. Then, according to the drive control device 1, by dispersing the timings of the energization stop states of the coils Lu, Lv, and Lw, timings of vibrations generated when the energization to the coils Lu, Lv, and Lw is switched can be dispersed for the respective coils Lu, Lv, and Lw. That is, according to the drive control device 1, dispersing the timings of the vibrations generated when the energization to the coils Lu, Lv, and Lw is switched can reduce overlap of the vibrations generated when the energization to the coils Lu, Lv, and Lw is switched.

Thus, according to the drive control device 1, it is possible to reduce vibration caused by switching of energization to the coils Lu, Lv, and Lw in the motor 20.

In the drive control device 1, the energization stop time period may be calculated to be shorter as the rotation speed increases. In this way, according to the drive control device 1, unlike the case where the energization stop time period is constant regardless of the rotation speed, the energization stop time period can be shortened when the rotation speed increases. That is, by calculating the energization stop time period according to the rotation speed, the energization stop time period can be adjusted so that the ratio of the energization stop time period with respect to one energization time period does not change according to the rotation speed.

Additionally, as illustrated in FIG. 5, the energization stop time period may be started after the elapse of the predetermined time period tw4 after the end of energization to any of the coils Lu, Lv, and Lw of the motor 20. In this way, according to the drive control device 1, when the energization to the coils Lu, Lv, and Lw of the motor 20 is switched in the motor device 10, it is possible to reduce the vibration caused by the switching of the energization to the coils Lu, Lv, and Lw in the motor 20 by dispersing the timings of the switching.

Additionally, the energization signal generation unit 44 may perform overlap energization in which energization to the coils other than any of the coils Lu, Lv, and Lw of the motor 20 is continued over a predetermined time period before the end of energization to the any of the coils Lu, Lv, and Lw described above of the motor 20. Since the overlap energization is a technique for reducing vibration generated when energization to the coils is switched, combining the overlap energization and the energization stop time period can reduce the vibration caused by the switching of energization to the coils Lu, Lv, and Lw in the motor 20.

In addition, a person skilled in the art can appropriately modify the disclosure according to conventionally known knowledge. Such modifications are of course included in the scope of the disclosure as long as these modifications still include the configuration of the disclosure.

For example, in the embodiment, an example has been described in which the drive control device 1 performs overlap energization in which the power supply current I flows in an overlapping manner to the coils Lu, Lv, and Lw of the two systems of the motor 20, and after the end of energization to any of the coils Lu, Lv, and Lw of the motor 20, the energization stop time period is set for the other coils Lu, Lv, and Lw being energized other than the any of the coils Lu, Lv, and Lw. However, in the drive control device 1, the process of setting the energization stop time period for the other coils Lu, Lv, and Lw being energized other than any of the coils Lu, Lv, and Lw of the motor 20 after the end of energization to the any of the coils Lu, Lv, and Lw can be applied even when the overlap energization is not performed.

For example, in the embodiment, an example in which the drive control device 1 is applied to drive control of the brushless motor 20 having four poles and six slots has been described. However, in the drive control device 1, the number of poles, the number of slots, and the number of phases of the motor 20 are not limited.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A motor control device comprising:

a rotation speed calculation unit configured to calculate a rotation speed of a motor based on a rotation position detection signal of the motor;

an energization stop time period calculation unit configured to calculate an energization stop time period for stopping energization to all coils included in the motor based on the rotation speed of the motor; and an energization signal generation unit configured to generate an energization signal for controlling energization to each of the coils of the motor to switch energization to each of the coils of the motor and to stop energization to all the coils of the motor in the energization stop time period; and the energization stop time period is calculated to be shorter as the rotation speed increases; and a ratio of the energization stop time period with respect to one energization time period does not change according to the rotation speed, after an end of energization to any of the coils of the motor, the energization signal generation unit stops energization to the coils of the motor being energized other than the any of the coils over the energization stop time period, and the energization signal generation unit performs overlap energization in which before an end of energization to any of the coils of the motor, energization to the coils of the motor other than the any of the coils is continued over a predetermined time period, and wherein the energization stop time period after high-side overlap energization differs in lengths from the energization stop time period after low-side overlap energization.

2. The motor control device according to claim 1, wherein after an end of energization to any of the coils of the motor, the energization stop time period is started after elapse of a predetermined time period.

3. The motor control device according to claim 1, wherein the energization stop time period calculation unit calculates the energization stop time period having two or more types of lengths.

4. The motor control device according to claim 1, wherein the energization signal generation unit calculates an energization stop time period only for energization to one or some of phases of the coils of the motor.

5. The motor control device according to claim 4, wherein the energization signal generation unit calculates an energization stop time period for energization at a high side of each phase of the coils of the motor.

6. The motor control device according to claim 4, wherein the energization signal generation unit calculates an energization stop time period for energization at a low side of each phase of the coils of the motor.

7. A motor drive control device comprising:

the motor control device according to claim 1; and a drive circuit configured to drive the motor based on the energization signal.

8. A motor device, wherein the motor device includes the motor drive control device according to claim 7, and the motor is a brushless type including a plurality of the coils.

9. A motor control program configured to be executed by a computer, the motor control program comprising;

calculating a rotation speed of a motor based on a rotation position detection signal of the motor;

calculating an energization stop time period for stopping energization to all coils included in the motor based on the rotation speed of the motor; and generating an energization signal for controlling energization to each of the coils of the motor to switch energization to each of the coils of the motor and to stop energization to all the coils of the motor in the energization stop time period; and the energization stop time period is calculated to be shorter as the rotation speed increases; and a ratio of the energization stop time period with respect to one energization time period does not change according to the rotation speed, after an end of energization to any of the coils of the motor, stopping energization to the coils of the motor being energized other than the any of the coils over the energization stop time period, and the energization signal generates overlap energization in which before an end of energization to any of the coils of the motor, energization to the coils of the motor other than the any of the coils is continued over a predetermined time period, and wherein the energization stop time period after high-side overlap energization differs in lengths from the energization stop time period after low-side overlap energization.

10. The motor control program according to claim 9, wherein in the calculating of the energization stop time period, the energization stop time period having two or more types of lengths is calculated.

11. The motor control program according to claim 9, wherein in the generating of the energization signal for controlling the energization to each of the coils of the motor, the energization signal for stopping energization to all the coils of the motor in the energization stop time period is generated only for energization to one or some of phases of the coils of the motor.

12. The motor control program according to claim 11, wherein the energization signal for stopping energization to all the coils of the motor in the energization stop time period is generated for energization at a high side of each phase of the coils of the motor.

13. The motor control program according to claim 11, wherein the energization signal for stopping energization to all the coils of the motor in the energization stop time period is generated for energization at a low side of each phase of the coils of the motor.

* * * * *